(12) United States Patent
Ishiguro

(10) Patent No.: US 10,936,188 B2
(45) Date of Patent: Mar. 2, 2021

(54) IN-VEHICLE DEVICE, DISPLAY AREA SPLITTING METHOD, PROGRAM, AND INFORMATION CONTROL DEVICE

(71) Applicant: Clarion Co., Ltd., Saitama (JP)

(72) Inventor: Akari Ishiguro, Saitama (JP)

(73) Assignee: Clarion Co., Ltd., Saitama (JP)

( * ) Notice: Subject to any disclaimer, the term of this patent is extended or adjusted under 35 U.S.C. 154(b) by 0 days.

(21) Appl. No.: 16/064,601

(22) PCT Filed: Dec. 22, 2016

(86) PCT No.: PCT/JP2016/088474
§ 371 (c)(1),
(2) Date: Jun. 21, 2018

(87) PCT Pub. No.: WO2017/111075
PCT Pub. Date: Jun. 29, 2017

(65) Prior Publication Data
US 2019/0012078 A1    Jan. 10, 2019

(30) Foreign Application Priority Data

Dec. 22, 2015 (JP) .............................. JP2015-249794

(51) Int. Cl.
*G06F 3/0488* (2013.01)
*G06F 3/0484* (2013.01)

(52) U.S. Cl.
CPC ........ *G06F 3/04886* (2013.01); *G06F 3/0484* (2013.01); *G06F 3/0488* (2013.01); *G06F 3/04845* (2013.01); *G06F 2203/04803* (2013.01)

(58) Field of Classification Search
CPC ............... G06F 3/04886; G06F 3/0484; G06F 3/04845; G06F 3/0488; G06F 2203/04803
See application file for complete search history.

(56) References Cited

U.S. PATENT DOCUMENTS 7,694,221 B2 * 4/2010 Fortes ................. G06F 16/9038
715/249
2002/0191028 A1 * 12/2002 Senechalle ............ G06F 3/0481
715/800

(Continued)

FOREIGN PATENT DOCUMENTS

EP    2 328 062 A2    6/2011
EP    2 796 980 A1    10/2014

(Continued)

OTHER PUBLICATIONS

JP2009229172A English translation; Author Kumita (Year: 2009).*

(Continued)

*Primary Examiner* — Mandrita Brahmachari
(74) *Attorney, Agent, or Firm* — Crowell & Moring LLP

(57) ABSTRACT

Provided is an in-vehicle device capable of setting split areas of appropriate sizes and displaying display information in each of the split areas in an easier-to-see display form. A layout of a plurality of display areas each displaying information can be easily changed by a user. The in-vehicle device including a display unit having a display area includes: an operation detection unit that detects an operation on a touch panel; a split area setting unit that identifies one layout among predetermined layouts related to split areas obtained by splitting the display area based on the operation having been detected and that sets the split areas according to the layout having been identified; and a display information generation unit that identifies an item and a display form of display information for each of the split areas based on a display information type and a shape type of each of the split areas corresponding to a setting position of each of the split areas, and that displays the display information in the corresponding split area in the display form having been identified.

15 Claims, 14 Drawing Sheets

(56) References Cited

U.S. PATENT DOCUMENTS

| | | | | |
|---|---|---|---|---|
| 2005/0280524 | A1* | 12/2005 | Boone | B60K 35/00 |
| | | | | 340/461 |
| 2006/0101352 | A1* | 5/2006 | Kohar | G06F 3/0481 |
| | | | | 715/788 |
| 2007/0168859 | A1* | 7/2007 | Fortes | G06Q 30/02 |
| | | | | 715/700 |
| 2007/0203878 | A1* | 8/2007 | Fortes | G06F 16/9038 |
| 2007/0222769 | A1 | 9/2007 | Otsuka et al. | |
| 2008/0074549 | A1 | 3/2008 | Kumano | |
| 2009/0144653 | A1* | 6/2009 | Ubillos | G06F 3/0483 |
| | | | | 715/800 |
| 2012/0159314 | A1* | 6/2012 | Schrier | G06F 16/9577 |
| | | | | 715/252 |
| 2013/0290885 | A1 | 10/2013 | Kobayashi | |
| 2014/0013216 | A1 | 1/2014 | Sakuta | |
| 2014/0208262 | A1* | 7/2014 | Huang | G06F 3/0481 |
| | | | | 715/800 |
| 2014/0237421 | A1* | 8/2014 | Kuhne | G06F 17/211 |
| | | | | 715/800 |
| 2015/0007078 | A1* | 1/2015 | Feng | G06F 3/0484 |
| | | | | 715/771 |
| 2015/0015511 | A1 | 1/2015 | Kwak et al. | |
| 2015/0074566 | A1* | 3/2015 | Lee | G06F 3/0488 |
| | | | | 715/763 |
| 2016/0202884 | A1 | 7/2016 | Ohki et al. | |
| 2016/0239203 | A1 | 8/2016 | Sato | |

FOREIGN PATENT DOCUMENTS

| | | |
|---|---|---|
| JP | 63-231391 A | 9/1988 |
| JP | 2007-34456 A | 2/2007 |
| JP | 2007-257220 A | 10/2007 |
| JP | 2008-85546 A | 4/2008 |
| JP | 2008-227679 A | 9/2008 |
| JP | 2009-229172 A | 10/2009 |
| JP | 2012-123477 A | 6/2012 |
| JP | 2013-114266 A | 6/2013 |
| JP | 2013-228900 A | 11/2013 |
| JP | 2015-41271 A | 3/2015 |
| JP | 2015-87861 A | 5/2015 |
| JP | 2015-208602 A | 11/2015 |

OTHER PUBLICATIONS

JP2009229172A—English translation Author: Kumita et. al https://patents.google.com/patent/JP2009229172A/en (Year: 2009).*

International Search Report (PCT/ISA/210) issued in PCT Application No. PCT/JP2016/088474 dated Feb. 7, 2017 with English translation (four (4) pages).

Japanese-language Written Opinion (PCT/ISA/273) issued in PCT Application No. PCT/JP2016/088474 dated Feb. 7, 2017 (nine (9) pages).

Extended European Search Report issued in counterpart European Application No. 16878961.8 dated Jun. 27, 2019 ( 10 pages).

* cited by examiner

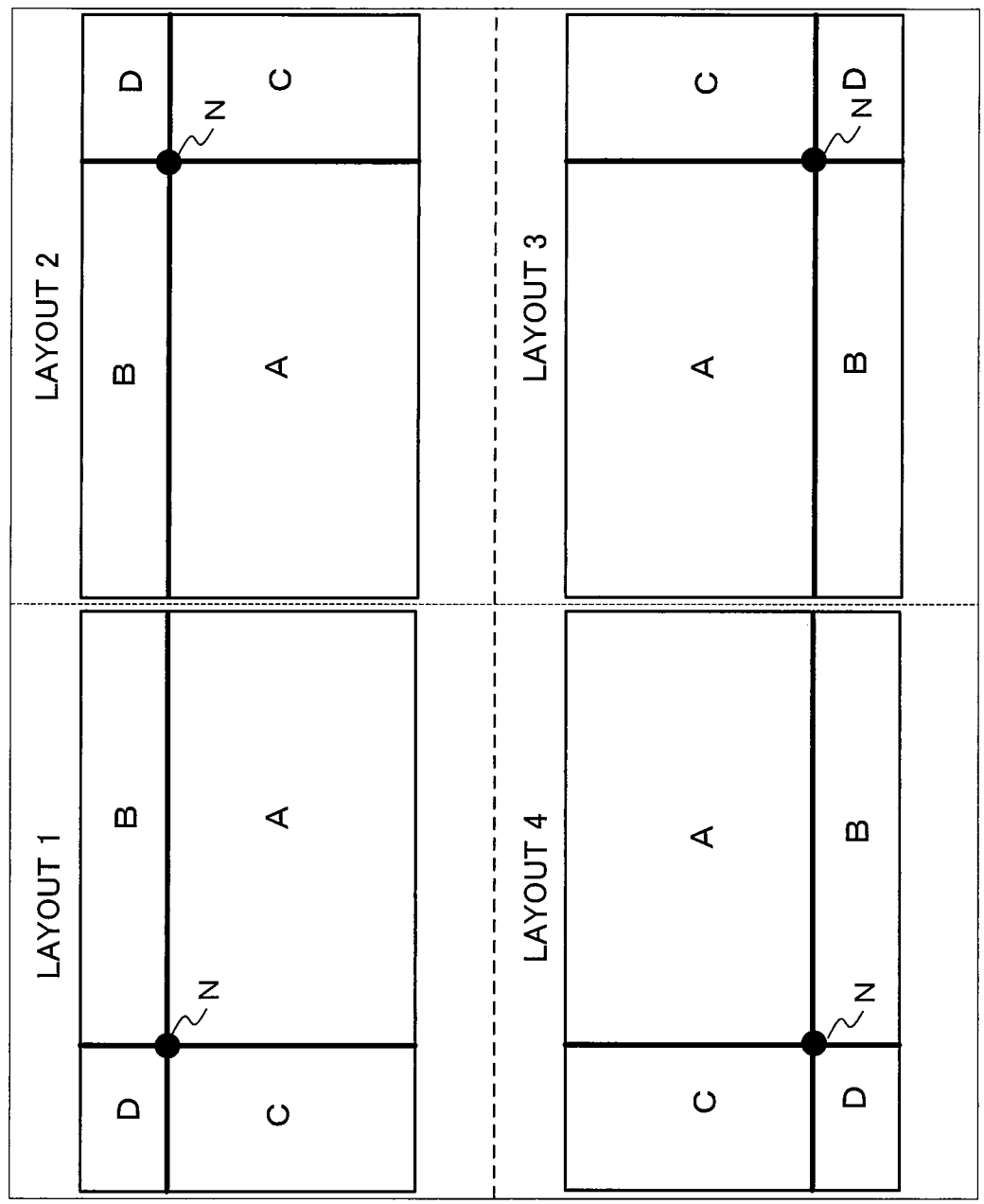

Fig. 5A
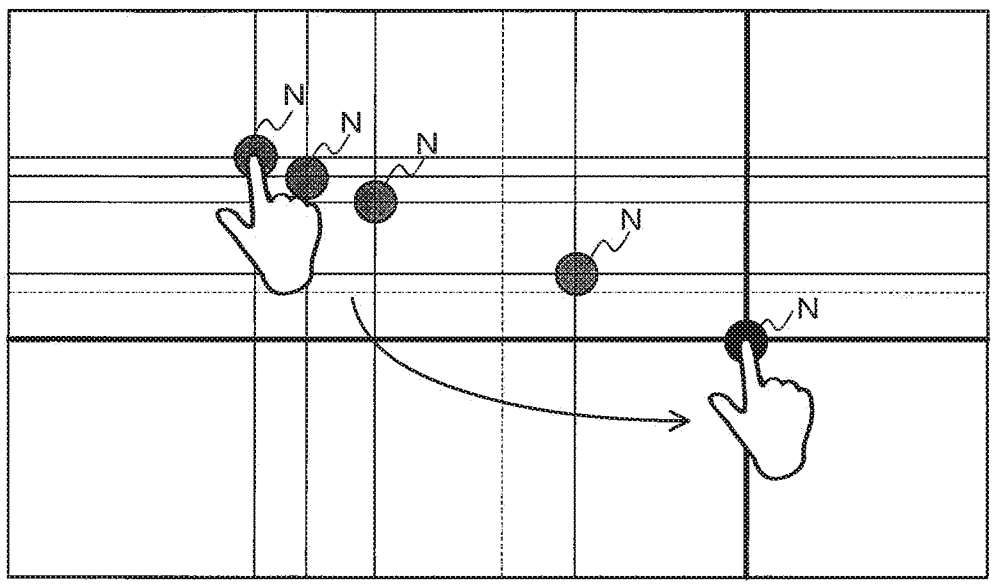
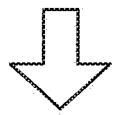
Fig. 5B
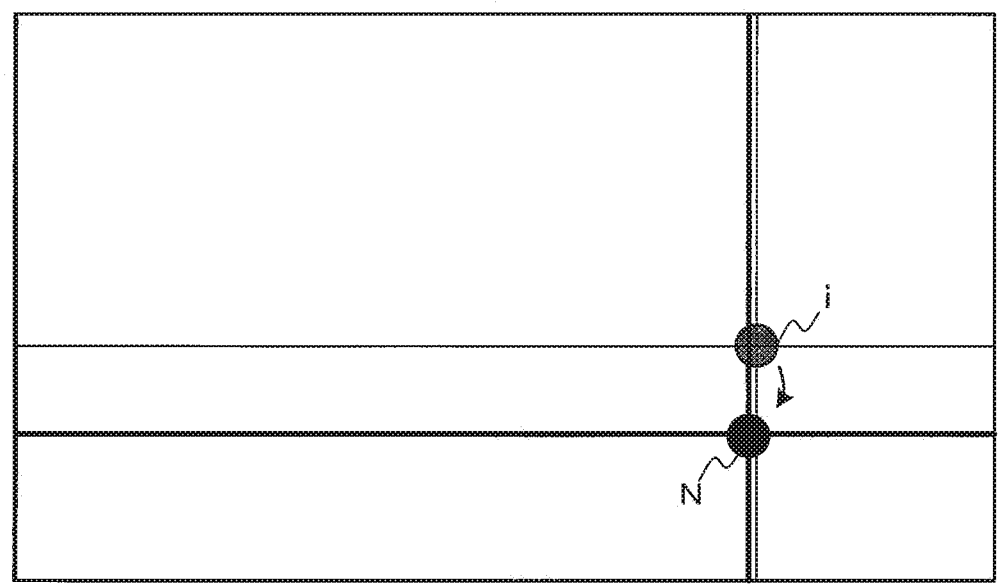

Fig. 6A
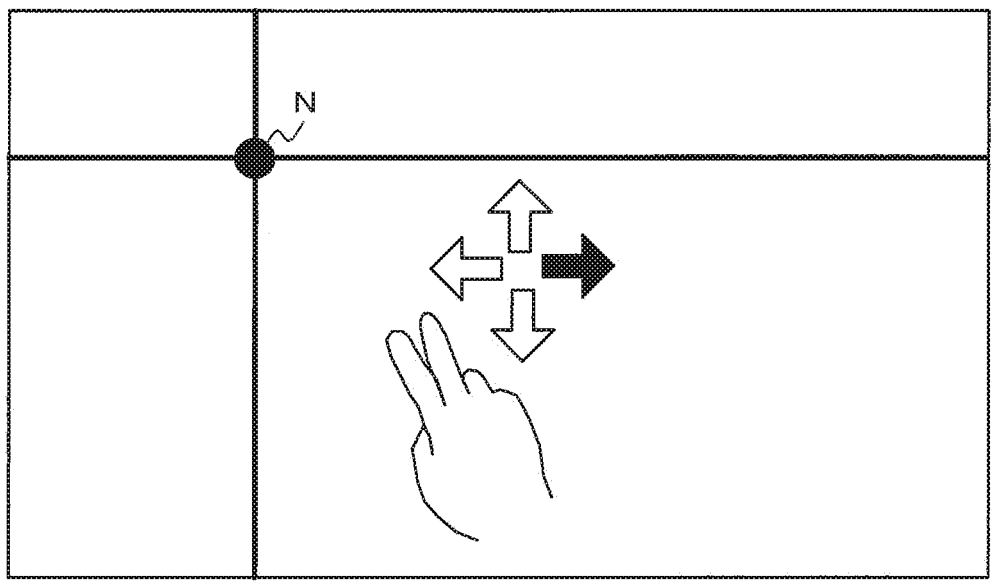
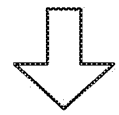
Fig. 6B
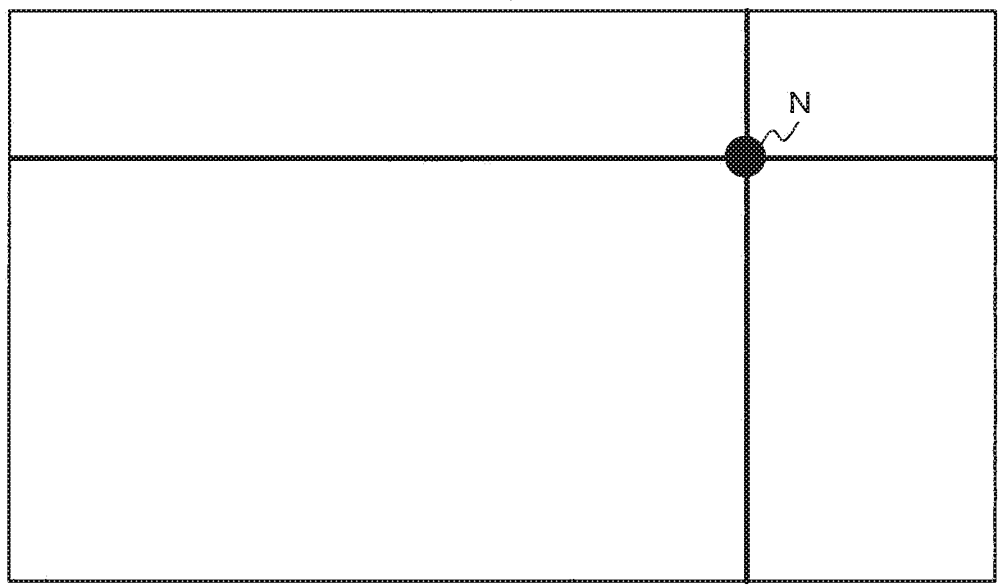

Fig. 12

| SHAPE TYPE OF DISPLAY AREA | TYPE | NAVI (124) | AUDIO (125) | APP (126) | TOOL (127) |
|---|---|---|---|---|---|
| ① FULL SCREEN |  | ·MAP<br>·MENU<br>·NAVIGATION SETTING<br>ETC. | ·EACH SOURCE<br>·IMAGE<br>ETC. | ·LAUNCHER<br>·EACH APPLICATION | ·CLOCK<br>·VARIOUS INDICATORS<br>·VARIOUS SETTING BUTTON<br>ETC. |
| ② THREE-FOURTH SCREEN |  | ·MAP<br>·MENU<br>·NAVIGATION SETTING<br>ETC. | ·EACH SOURCE<br>·IMAGE<br>ETC. | ·LAUNCHER<br>·EACH APPLICATION | ·CLOCK<br>·VARIOUS INDICATORS<br>·VARIOUS SETTING BUTTON<br>ETC. |
| ③ HORIZONTAL SUB SCREEN (HORIZONTAL BAND SCREEN) |  | ·GUIDANCE INFORMATION<br>LEFT AND RIGHT TURN<br>INFORMATION<br>INTERSECTION NAME<br>REMAINING DISTANCE,<br>ETC. | ·EACH SOURCE<br>PLAY INFORMATION<br>·BASIC OPERATION<br>BUTTON<br>ETC. | ·FIXED APPLICATION<br>(SPECIALIZED SCREEN)<br>·LAUNCHER CALL BUTTON | ·CLOCK<br>·VARIOUS INDICATORS<br>·CUSTOM BUTTON |
| ④ VERTICAL SUB SCREEN (VERTICAL BAND SCREEN) |  | ·GUIDANCE INFORMATION<br>LEFT AND RIGHT TURN<br>INFORMATION<br>INTERSECTION NAME<br>REMAINING DISTANCE,<br>ETC. | ·EACH SOURCE<br>PLAY INFORMATION<br>·BASIC OPERATION<br>BUTTON<br>ETC. | ·FIXED APPLICATION<br>(SPECIALIZED SCREEN)<br>·LAUNCHER CALL BUTTON | ·CLOCK<br>·VARIOUS INDICATORS<br>·CUSTOM BUTTON |
| ⑤ SMALL SUB SCREEN (SMALL SCREEN) |  | ·GUIDANCE INFORMATION<br>LEFT AND RIGHT TURN<br>INFORMATION<br>REMAINING DISTANCE,<br>ETC. | ·BASIC OPERATION<br>BUTTON | ·LAUNCHER CALL BUTTON | ·VARIOUS INDICATORS<br>·CUSTOM BUTTON |

IN-VEHICLE DEVICE, DISPLAY AREA SPLITTING METHOD, PROGRAM, AND INFORMATION CONTROL DEVICE

TECHNICAL FIELD

The present invention relates to an in-vehicle device, a display area splitting method, a program, and an information control device. The present invention claims priority based on Japanese Patent Application Number 2015-249794 applied on Dec. 22, 2015, and in specific countries where incorporation by reference of a literature is permitted, the contents described in the application are incorporated by reference herein.

BACKGROUND ART

Patent Literature 1 discloses an electronic device including a display unit that performs display in a display area, an operation detection unit that detects an operation on the display area, and a display controller that controls the display unit. In the Patent Literature 1, it is described that the display controller has a split display mode in which the controller splits a first display area included in the display area into a plurality of split areas and controls display of each of the plurality of split areas independently. In the split display mode, the controller causes the display unit to display an operation target image with which a setting for each of the plurality of split areas is made.

CITATION LIST

Patent Literature

Patent Literature 1: Japanese Unexamined Patent Publication No. 2015-87861

SUMMARY OF INVENTION

Technical Problem

In the electronic device of Patent Literature 1, sizes of the split areas can be freely changed by a user, and in each of the split areas having the size that is changed, an image having an aspect ratio changed from that of an image displayed before a change is displayed. Depending on the operation by the user, however, one split area may have a shape and a size inappropriate as the display area. In addition, in a case where an amount of information displayed before the change is fully displayed in a small split area or in a case where display is performed by changing the aspect ratio, there is a problem in that information that has been displayed may be very difficult to see.

Accordingly, it is an object of the present invention to provide an in-vehicle device in which a split area of an appropriate size is set and display information is displayed in an easier-to-see display form in each of the split areas.

It is also an object of the present invention to provide an information control device in which a layout of a plurality of display areas each displaying information can be easily changed by a user.

Solution to Problem

To solve the above-described problem, an in-vehicle device according to the present invention is an in-vehicle device including a display unit having a display area, and the in-vehicle device includes: an operation detection unit that detects an operation on a touch panel; a split area setting unit that identifies one layout among predetermined layouts related to split areas obtained by splitting the display area based on the operation having been detected, and sets the split areas according to the layout having been identified; and a display information generation unit that identifies an item and a display form of display information for each of the split areas based on a display information type and a shape type of each of the split areas corresponding to a setting position of each of the split areas, and displays the display information in the corresponding split area in the display form having been identified.

Advantageous Effects of Invention

With the in-vehicle device according to the present invention, it is possible to set the split area of an appropriate size and to display the display information in each of the split areas in an easier-to-see display form.

With the present invention, it is possible to provide an information control device in which the layout of the plurality of display areas each displaying information can be easily changed by a user.

Note that a problem, configuration, effect, and the like other than the above are clarified in descriptions of embodiments below.

BRIEF DESCRIPTION OF DRAWINGS

FIG. 3 is a diagram illustrating a layout of split areas according to one embodiment of the present invention.

FIG. 5A is a view illustrating a move of a pointer and a shape change of the split areas.

FIG. 5B is a view illustrating a position N of the pointer and a change of the split areas before and after a touch release.

FIG. 6A is a view illustrating a direction of a flick operation (or a swipe operation).

FIG. 6B is a view illustrating a layout of the split areas changed based on the direction of the flick operation (or the swipe operation).

FIG. 12 is a table illustrating an example of display rule information according to one embodiment of the present invention.

DESCRIPTION OF EMBODIMENTS

Hereinafter, one embodiment of the present invention is described.

Figure 1:
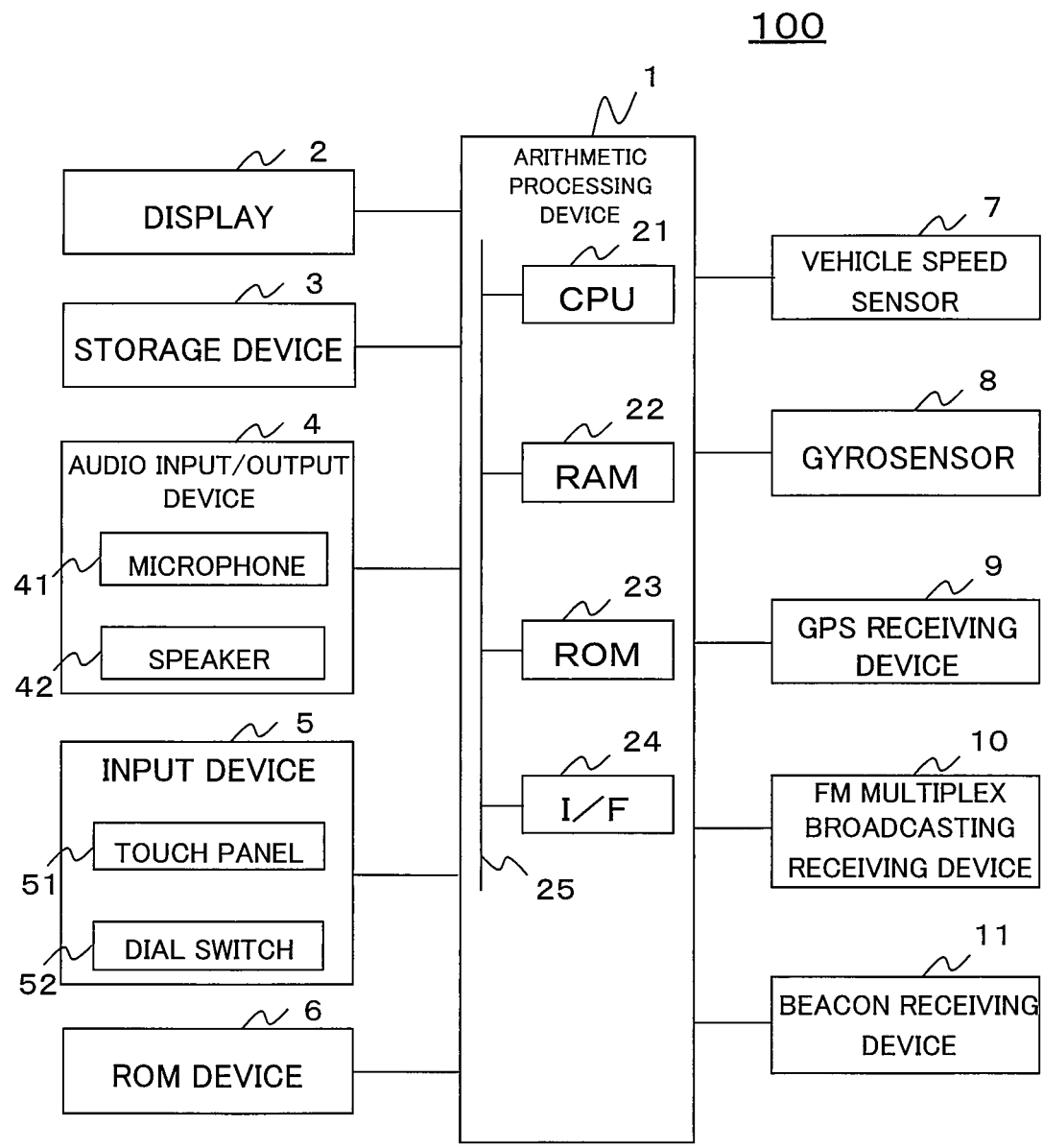
FIG. 1 is a diagram illustrating schematic configuration of an in-vehicle device according to one embodiment of the present invention.

FIG. 1 is a diagram illustrating schematic configuration of an in-vehicle device 100 according to this embodiment. The in-vehicle device 100 can be achieved, for example, by an in-vehicle navigation device having a navigation function. The navigation function referred to herein is a function provided to a normal navigation device such as displaying of map information, searching and guidance of a recommended route from a departure place (or a current place) to a destination place, and displaying of traffic information. Note that the in-vehicle device 100 is not limited to the navigation device and, for example, may also be a smart phone, a tablet terminal device, a personal data assistance (PDA), and the like. In this case, the navigation function is provided by application installed in these devices or a server device to which these devices can be connected.

As illustrated, the in-vehicle device 100 includes an arithmetic processing device 1, a display 2, a storage device 3, an audio input/output device 4 (including a microphone 41 as an audio input device and a speaker 42 as an audio output device), an input device 5, a read only memory (ROM) device 6, a vehicle speed sensor 7, a gyrosensor 8, a global positioning system (GPS) receiving device 9, a frequency modulation (FM) multiplex broadcasting receiving device 10, and a beacon receiving device 11.

The arithmetic processing device 1 is a central unit that performs various processing of the in-vehicle device 100. The arithmetic processing device 1, for example, detects the current place using information output from various sensors such as the vehicle speed sensor 7 and the GPS receiving device 9. Based on information of the current place having been obtained, the arithmetic processing device 1 reads map information necessary for displaying the information from the storage device 3 or the ROM device 6. The arithmetic processing device 1 expands the map information having been read into graphics and outputs a signal for displaying the graphics on the display 2 by superimposing a mark indicating the current place thereon. Using the map information and the like stored in the storage device 3 or the ROM device 6, the arithmetic processing device 1 calculates a recommended route connecting a departure place with a destination place instructed by the user. The arithmetic processing device 1 also performs guidance of the route by outputting a predetermined signal to the speaker 42 and the display 2.

The arithmetic processing device 1 sets split areas obtained by splitting a display area at a predetermined ratio. The arithmetic processing device 1 displays predetermined display information according to a layout of the split areas in each of the split areas in a predetermined display form.

Such arithmetic processing device 1 includes: a central processing unit (CPU) 21 that executes various processing such as arithmetic operation and controlling of each of the devices; random access memory (RAM) 22 that temporarily stores the map information, arithmetic operation data, and the like read from a memory device such as the storage device 3 and ROM 23; the ROM 23 that stores a boot program and the like achieved by the CPU 21; an interface (I/F) 24 for connecting various hardware with the arithmetic processing device 1; and a bus 25 that connects these components with each other.

The display 2 is a unit that displays graphics information. The display 2 is constituted of, for example, a liquid crystal display, an organic EL display, and the like.

The storage device 3 is constituted of at least a readable and writable storage medium such as a hard disk drive (HDD) and a non-volatile memory card. The storage device 3 stores, for example, various information (e.g. map information, display rule information, and the like) used by the arithmetic processing device 1. Note that details of the display rule information are described below.

The audio input/output device 4 includes the microphone 41 as an audio input device and the speaker 42 as an audio output device. The microphone 41 acquires audio outside of the in-vehicle device 100 such as a voice of a driver or a passenger (user speech) and the like. The speaker 42 outputs a guide for the driver and the like generated in the arithmetic processing device 1 as audio.

The input device 5 is a device that receives input of an instruction from the user. The input device 5 is constituted of a touch panel 51, a dial switch 52, and a hardware switch such as a scroll key, and the like (not illustrated). The input device 5 outputs information corresponding to operation of each key and each switch to another device such as the arithmetic processing device 1 and the like.

The touch panel 51 is the input device 5 installed on a display surface side of the display 2 and installed such that a display screen thereof can be seen through. The touch panel 51 detects a touch by a human finger and a touch by a specialized touch pen. A touch position by the user is identified, for example, based on XY coordinates set on the touch panel 51. Such touch panel 51 is constituted of, for example, an input detecting element of a capacitive sensing type and the like.

The ROM device 6 is constituted of at least a readable storage medium such as ROM including a compact disk (CD)-ROM and a digital versatile disk (DVD)-ROM, and an integrated circuit (IC) card. The storage medium stores, for example, video data, audio data, and the like.

The vehicle speed sensor 7 is a sensor that outputs a value used for calculating a vehicle speed. The gyrosensor 8 is constituted of a fiber optic gyroscope, a vibratory gyroscope, and the like, and it is a sensor that detects an angular velocity due to rotation of a mobile body. The GPS receiving device 9 measures a current place, a travel speed, and a travel azimuth of the mobile body by receiving a signal from a GPS satellite and by measuring a distance between the mobile body and the GPS satellite and a rate of change of the distance therebetween relative to three or more satellites. Each of the devices is used by the arithmetic processing device 1 for detecting the current place of a vehicle installed with the in-vehicle device 100.

The FM multiplex broadcasting receiving device 10 receives an FM multiplex broadcasting signal transmitted from an FM broadcasting station. FM multiplex broadcasting includes VICS information such as outline present state traffic information, restriction information, service area (SA)/parking area (PA) information, parking lots information, and weather information as well as FM multiplex general information such as text information provided by a radio station.

The beacon receiving device 11 receives the VICS information such as the outline present state traffic information, the restriction information, the SA/PA information, the parking lots information, the weather information, and an emergency alert. The beacon receiving device 11 may be, for example, an optical beacon that optically communicates, a radio wave beacon that communicates using radio wave, and the like.

As above, a hardware configuration of the in-vehicle device 100 has been described.

Figure 2:
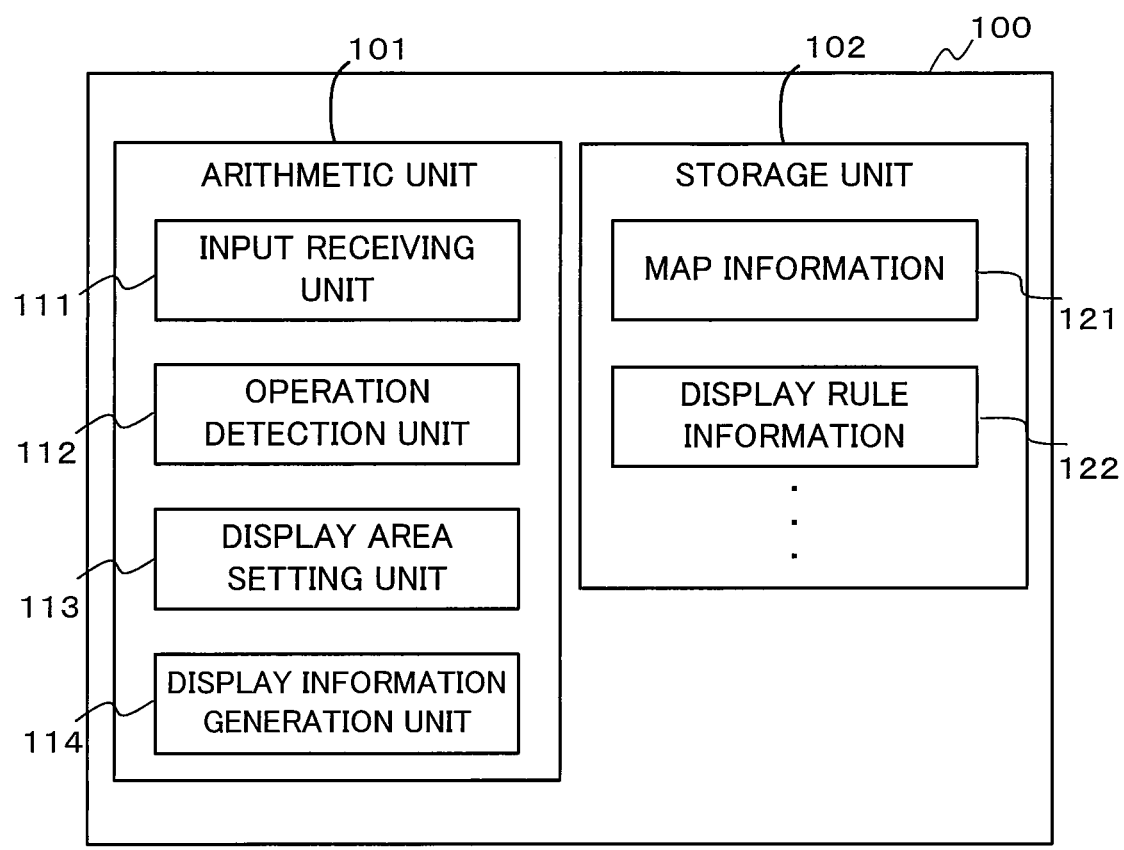
FIG. 2 is a diagram illustrating an example of a functional block of the in-vehicle device according to one embodiment of the present invention.

Next, a functional block illustrating a functional configuration of the in-vehicle device 100 is described. FIG. 2 is a diagram illustrating an example of the functional block of the in-vehicle device 100. The in-vehicle device 100 includes an arithmetic unit 101, and a storage unit 102. Further, the arithmetic unit 101 includes an input receiving unit 111, an operation detection unit 112, a display area setting unit 113, and a display information generation unit 114.

The input receiving unit 111 is a functional unit that receives an instruction from the user and input of information through the input device 5 (in this case, the dial switch 52 and the hardware switch) provided to the in-vehicle device 100. For example, the input receiving unit 111 receives setting of a departure place and a destination place, a search instruction of a recommended route, and the like from the user through the input device 5.

The operation detection unit 112 is a functional unit that detects operation on the touch panel 51 by a finger of the user or a specialized touch pen. Specifically, the operation detection unit 112 detects a touch on the touch panel 51, an operation of changing a touch position while holding the touch (hereinafter, referred to as a drag operation), and release of the touch. The operation detection unit 112 also identifies a coordinate position on the touch panel 51 that is touched and a coordinate position at which the touch is released.

The operation detection unit 112 detects an operation of moving the touch position on the touch panel 51 in a fixed direction of up, down, left, or right (e.g. a flick operation or a swipe operation) and identifies the direction of the operation (direction of the flick operation or the swipe operation). The flick operation referred to herein is an operation of sliding the touch position on the touch panel 51 in the fixed direction and releasing the touch from the touch panel 51. Further, the swipe operation refers to an operation of sliding the touch position on the touch panel 51 in the fixed direction. Note that the flick operation referred to hereinafter may also be the swipe operation in place of the flick operation.

The operation detection unit 112 also detects multiple (e.g. two) touches on the touch panel 51 within a predetermined time (e.g. 0.5 seconds) (hereinafter, referred to as a double-tap operation) and identifies coordinates on the touch panel 51 indicating each of the touch positions.

When detecting such touch operation or touch release, the operation detection unit 112 generates a signal associating a type of the touch, a coordinate position of the touch, a coordinate position of the touch release, a direction of the flick operation, and coordinates of each of the touch positions of the double-tap operation with each other, and outputs the signal to the display area setting unit 113.

The display area setting unit 113 is a functional unit that sets the display area. Specifically, the display area setting unit 113 sets a full-screen area using an entire display area as one display area or split areas that are the full-screen area split into a predetermined number (e.g. four).

Here, the split areas set by the display area setting unit 113 are described. FIG. 3 is a view illustrating layouts of the split areas. In a layout 1, a split area A occupying three-fourth of an entire screen (hereinafter, referred to as a "three-fourth screen") is set at a lower right position. The three-fourth screen is a similar figure of the full-screen area, which has a ratio of a long side to a short side of 16:9, and similar with the full-screen area, the three-fourth screen is configured to have a ratio of a long side to a short side of 16:9. By extending sides partitioning the three-fourth screen from an intersection point (pointer position N), a split area B (hereinafter, referred to as a "horizontal sub screen"), a split area C (hereinafter, referred to as a "vertical sub screen"), and a split area D (hereinafter, referred to as a "small sub screen") are set. Note that numerical values such as the ratio of the long side to the short side (16:9) and the occupied area (three-fourth) are not used in a strict meaning and may also include values within a range that can be regarded as substantially the same.

In a layout 2, the three-fourth screen is set at a lower left position. In a layout 3, the three-fourth screen is set at an upper left position. In a layout 4, the three-fourth screen is set at an upper right position. Note that a size and a ratio of each of the split areas A to D according to the layouts 2 to 4 are the same as those of the layout 1.

The display area setting unit 113 changes the layout of the display area based on the signal output from the operation detection unit 112. For example, a case is described in which the touch operation is performed on a pointer in a state where the split areas of the layout 1 are displayed.

When detecting that a user has performed a drag operation while touching the pointer, the operation detection unit 112 detects a coordinate position of the pointer on the touch panel 51 and periodically (e.g. every 0.1 seconds) outputs a signal associating the coordinate position with the type of the touch operation (here, the drag operation) to the display area setting unit 113. When detecting that the touch has been released, the operation detection unit 112 outputs a signal associating the coordinate position with the type of the touch operation (here, the touch release) to the display area setting unit 113. When acquiring the signal, the display area setting unit 113 identifies in which region set on the touch panel 51 is a touch release position included and determines the layout of the split areas.

Figure 4A:
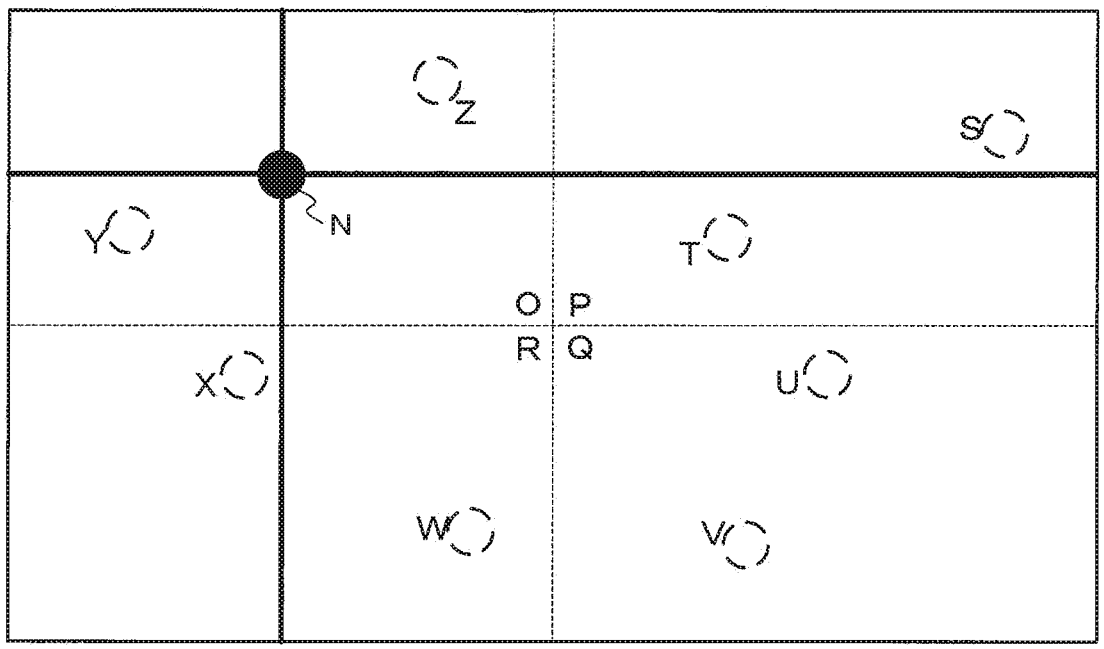
FIG. 4A is a view illustrating an example of touch release detection regions O to R and a touch release position.

FIG. 4(a) is a view illustrating an example of touch release detection regions O to R and the touch release position. The display area setting unit 113 sets the touch release detection regions O to R on the display 2. Such regions are obtained by splitting the full-screen area into four by connecting midpoints of the long side and the short side thereof. The display area setting unit 113 sets the split areas of the layout 2 in a case where a touch on the pointer is released in the touch release detection region P (release positions S and T). The display area setting unit 113 sets the split areas of the layout 3 in a case where the touch on the pointer is released in the touch release detection region Q (release positions U and V). The display area setting unit 113 sets the split areas of the layout 4 in a case where the touch on the pointer is released in the touch release detection region R (release positions W and X). The display area setting unit 113 sets the split areas of the layout 1 in a case where the touch on the pointer is released in the touch release detection region O (release positions Y and Z).

Figure 4B:
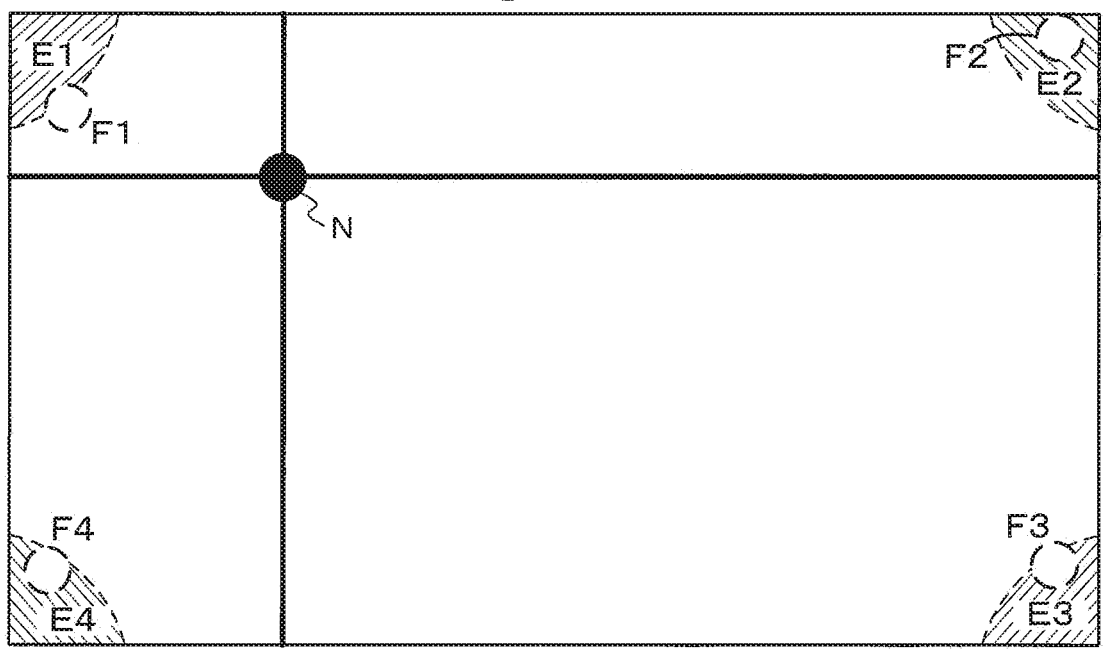
FIG. 4B is a view illustrating an example of touch release detection regions E1 to E4 and touch release positions F1 to F4.

The display area setting unit 113 sets the full-screen area in a case where the touch on the pointer is released in the vicinity of four corners of the display area. FIG. 4(b) is a view illustrating an example of touch release detection regions E1 to E4 and touch release positions F1 to F4. At the same time as setting the touch release detection regions O to R, the display area setting unit 113 also sets the touch release detection regions E1 to E4 on the display 2. Each of such regions is a quarter circle region including an apex of the four corners of the display area. In a case where the touch on the pointer is released in any one of the touch release detection regions E1 to E4, the display area setting unit 113 sets the full-screen area as the display area. Note that in a case where the full-screen area is set, the display area setting unit 113 outputs a signal indicating coordinates of the touch release position to the display information generation unit 114.

Note that the display area setting unit 113 temporarily sets freely variable split areas while the pointer is moved and outputs a display instruction to the display information generation unit 114. FIG. 5(a) is a view illustrating a move of the pointer and a change in shapes of the split areas. While the pointer is moved, that is at the time prior to acquiring the signal including the touch release position from the operation detection unit 112, the display area setting unit 113 temporarily sets the split areas that are split into four using a coordinate position of the pointer, which is periodically acquired from the operation detection unit 112, as the intersection point. The display area setting unit 113 outputs the display instruction of such split areas to the display information generation unit 114. Accordingly, while the pointer is moved, the split areas that change shapes thereof according to the pointer position N are displayed.

When the touch release is detected by the operation detection unit 112, the display area setting unit 113 determines any one of the layouts 1 to 4 according to the release position and sets the split areas corresponding to such layout. FIG. 5(b) is a view illustrating the pointer position N and a change of the split areas before and after the touch release. When the touch on the pointer is released at a position i, the split areas that have temporarily been set and been displayed are changed into the split areas of the layout 3.

When detecting that the user has performed the flick operation on the touch panel 51, the operation detection unit 112 identifies the type of the touch operation (here, the flick operation) and the direction of the flick operation and outputs a signal associating them with each other to the display area setting unit 113. The display area setting unit 113 determines the layout of the split areas based on the direction of the flick operation.

FIG. 6(a) is a view illustrating a direction of the flick operation (or the swipe operation). When acquiring a signal indicating that the flick operation is made in the right direction, the display area setting unit 113 identifies the current layout of the split areas. For example, in a case where the split areas of the layout 1 are displayed, the display area setting unit 113 identifies the layout of the split areas in which the pointer is moved in parallel in the right direction. That is, the display area setting unit 113 identifies the layout 2 and sets the split areas according to such layout. FIG. 6(b) is a view illustrating the layout of the split areas changed based on the direction of the flick operation (or the swipe operation).

For example, when acquiring a signal indicating the flick operation is in a downward direction while the split areas of the layout 2 are displayed, the display area setting unit 113 identifies the layout of the split areas in which the pointer is moved in parallel in the downward direction. That is, the display area setting unit 113 identifies the layout 3 and sets the split areas according to the layout.

Further, when detecting that the user has performed the double-tap operation at any one of the four corners of the display area, the operation detection unit 112 identifies coordinates on the touch panel 51 indicating each of the touch positions, and transmits a signal associating the type of the touch operation (here, the double-tap operation) with each of the coordinate positions thereof to the display area setting unit 113. The display area setting unit 113 sets the full-screen area in a case where coordinates of each of the touch positions of the double-tap operation is included in any one region of the four corners of the display area. Note that in a case where the full-screen area is set by the double-tap operation, the display area setting unit 113 outputs a signal indicating the coordinate position that has been touched to the display information generation unit 114.

Descriptions are given returning to FIG. 2. The display information generation unit 114 is a functional unit that generates display information to be displayed in the display area. Specifically, the display information generation unit 114 identifies the display information and the display form using the display rule information and displays the display information in the display form that has been identified.

The display rule information is information associating a display information type and an item thereof with a display form of each of the items for each type of the split area (the "full-screen area", "three-fourth screen", "horizontal sub screen", "vertical sub screen", and "small sub screen"). The display information type includes, for example, navigation-related display information, audio-related display information, tool-related display information, application content (APP)-related display information, and the like.

Note that in a case where the display information type is navigation, the item thereof includes guidance information such as a map, a menu, a navigation setting, left and right turn information (arrow mark), and an intersection name. In a case where the display information type is audio, the item thereof includes each source, an image, play information of each of the sources, a basic operation button, and the like. In a case where the display information type is APP, the item thereof includes a launcher, each application, a fixed application, a launcher call button, and the like. Further, in a case where the display information type is a tool, the item thereof includes a clock, various indicators, various setting buttons, a custom button, and the like.

In a case where any one of the layouts 1 to 4 is set, the display information generation unit 114 selects one split area among the split areas that are split into four, and identifies the type of the split areas. For example, in a case where the split area on the upper right in the layout 1 is selected, the display information generation unit 114 identifies that the split area is the horizontal sub screen.

The display information generation unit 114 also identifies the display information type associated with the split area that has been selected. For example, the display information generation unit 114 acquires predetermined information (not illustrated) including a correspondence relation between a position of each of the split areas and the display information type from a storage unit. Based on the information, the display information generation unit 114 identifies the display information type associated with each of the split areas.

Using the display rule information, the display information generation unit 114 also identifies the item of the display information and the display form to be displayed in each of the split areas. Specifically, based on the type of the split area and the display information type that have been identified, the display information generation unit 114 identifies the item of the display information and the display form thereof from the display rule information, and displays the information in the split area.

In this way, the display information generation unit 114 identifies the display information and the display form for all of the split areas in the layout that is set, and displays the information in each of the split areas.

Figure 7A:
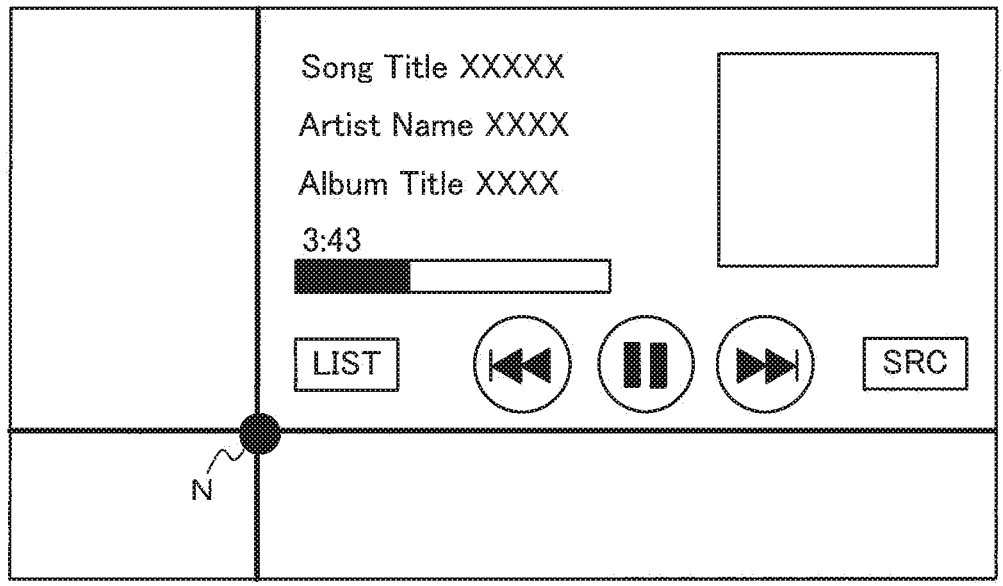
FIG. 7A is a view illustrating display information displayed in a display form different for each type of the split areas.

FIGS. 7(a) and 7(b) and FIGS. 8(a) and 8(b) are views illustrating the display information displayed in the display form different for each type of the split areas. Note that in this embodiment, the split area positioned on the upper right is associated with the audio as the display information type. In FIG. 7(a), since the type of the split area is the "three-fourth screen", more display information is displayed therein than in the split area of another type as the item of the display information such as text information, a music play progress bar, an album jacket, play time, a music operation button, and a list call button.

Figure 7B:
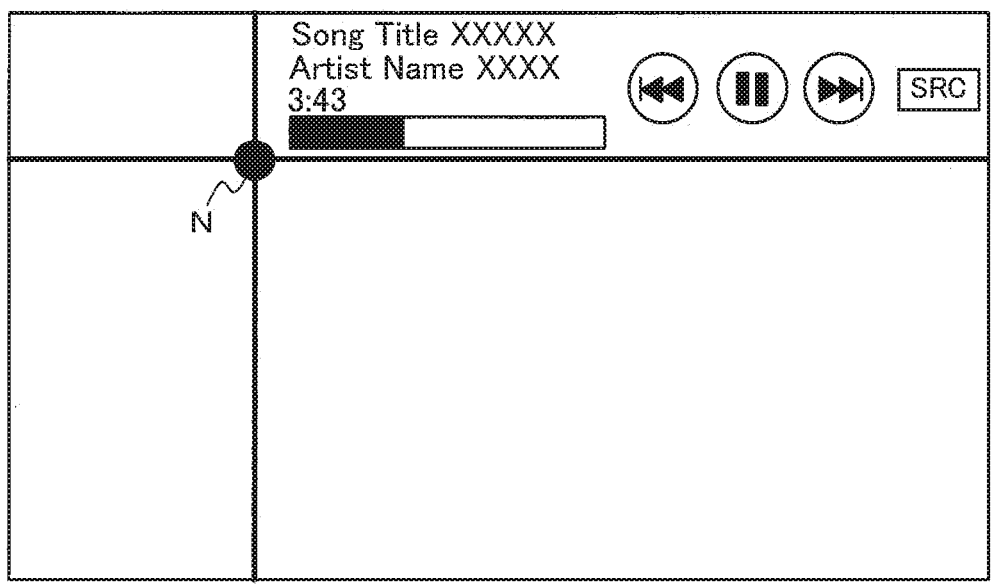
FIG. 7B is a view illustrating display information displayed in a display form different for each type of the split areas.
Figure 8A:
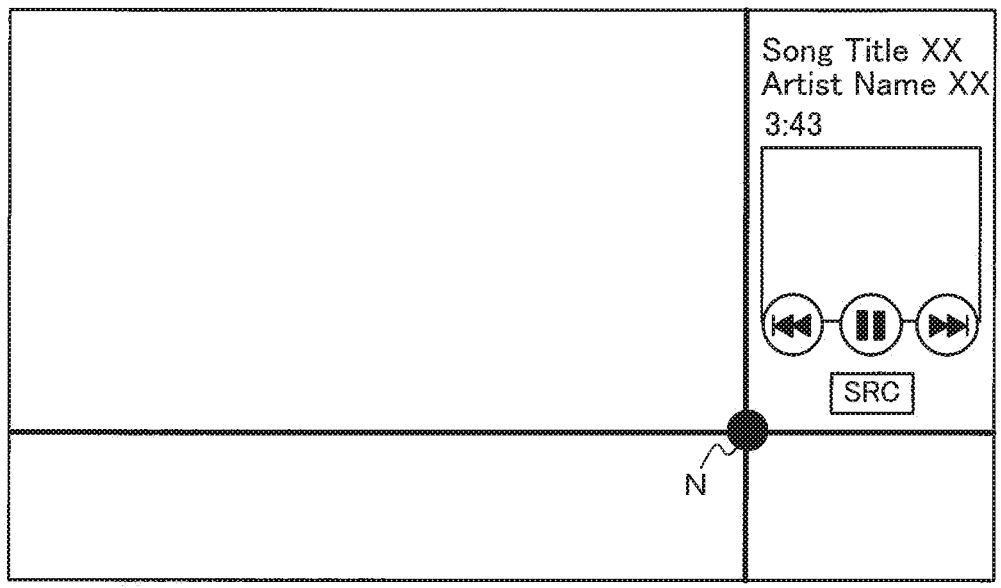
FIG. 8A is a view illustrating the display information displayed in a display form different for each type of the split areas.

In FIG. 7(b), since the type of the split area is the "horizontal sub screen", the item of the display information suitable for the horizontally-long split area, that is, the text information, the play time, the music operation button, and the like are displayed. In FIG. 8(a), since the type of the split area is the "vertical sub screen", the item of the display information suitable for the vertically-long split area, that is, the text information, the play time, the album jacket, the music operation button, and the like are displayed.

Figure 8B:
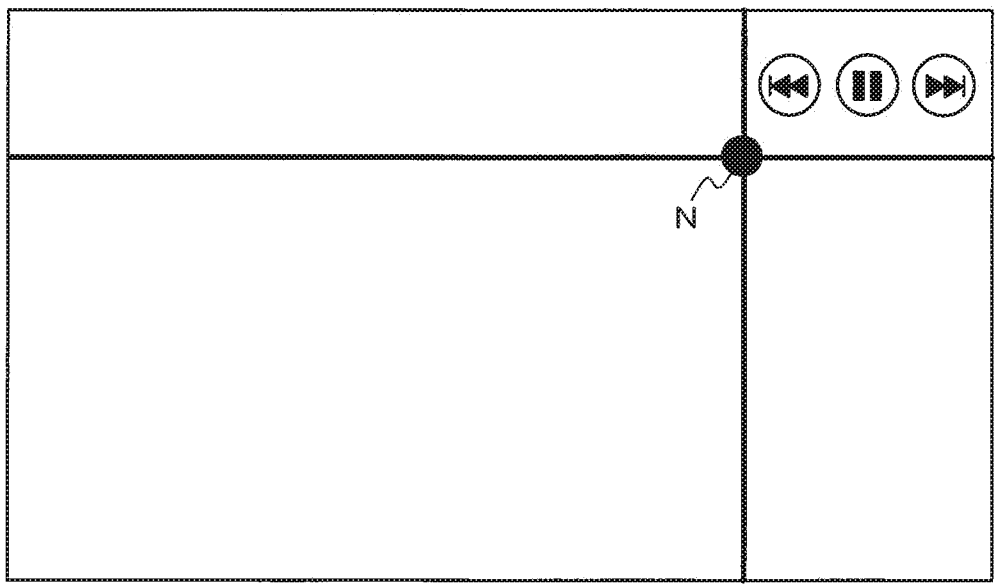
FIG. 8B is a view illustrating the display information displayed in a display form different for each type of the split areas.

In FIG. 8(b), since the type of the split area is the "small sub screen", the minimum-required item of the display information, that is, the music operation button is displayed.

In a case where the full-screen area is set, based on the signal acquired from the display area setting unit 113, the display information generation unit 114 identifies a touch release position or a coordinate position of the double-tap operation. The display area setting unit 113 also acquires predetermined information (not illustrated) including a correspondence relation between the coordinate position that has been identified and the display information type. Based on the information, the display area setting unit 113 identifies the display information type to be displayed on the full-screen area. As above, the display information generation unit 114, identifies the item of the display information and the display form thereof to be displayed in the full-screen area using the display rule information, and displays the display information in the display form that has been identified.

The storage unit 102 is a functional unit that stores the predetermined information. Specifically, the storage unit 102 stores map information 121, display rule information 122, and a variety of information (not illustrated).

As above, the functional block of the in-vehicle device 100 is described.

Note that the input receiving unit 111, the operation detection unit 112, the display area setting unit 113, and the display information generation unit 114 of the in-vehicle device 100 are achieved by a program that causes the CPU 21 to perform processing. The program is stored in the ROM 23 or the storage device 3 of the in-vehicle device 100. At the time of execution, the program is loaded on the RAM 22 and is executed by the CPU 21.

Each of the functional blocks has been classified according to main processing contents so as to facilitate understanding of functions of the in-vehicle device 100 achieved in this embodiment. Thus, the present invention is not to be limited by a classification method or a name of each of the functions. Further, each configuration of the in-vehicle device 100 may be classified into more constituent elements according to processing contents thereof. It is also possible to classify such that one constituent element executes more processing.

All or part of each of the functional units may be constituted of hardware (integrated circuit such as ASIC) implemented on a computer. Processing of each of the functional units may be executed by one piece of hardware or may be executed by a plurality of pieces of hardware.

Note that the storage unit 102 of the in-vehicle device 100 is achieved by the ROM 23 and the storage device 3.

[Description of Operation]

Figure 9:
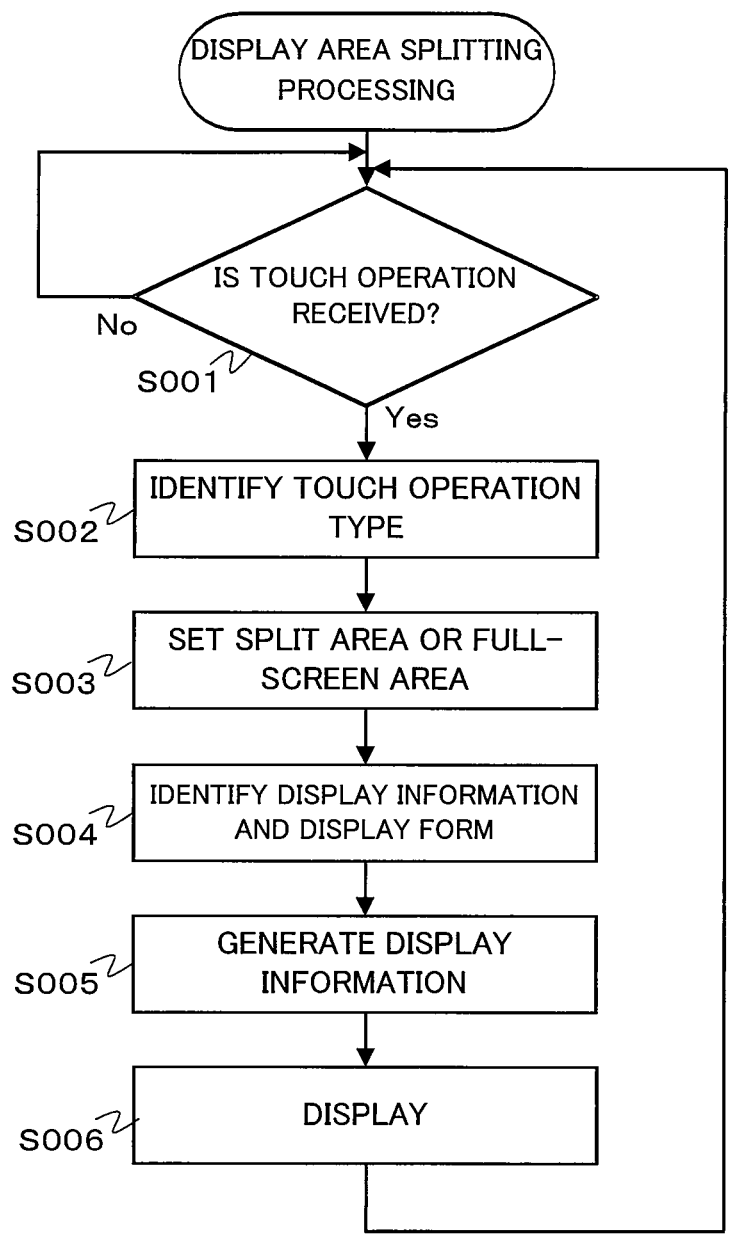
FIG. 9 is a flowchart illustrating a flow of display area splitting processing according to one embodiment of the present invention.

Next, display area splitting processing executed by the in-vehicle device 100 is described. FIG. 9 is a flowchart illustrating a flow of the display area splitting processing. Such processing is started together with a startup of the in-vehicle device 100.

When the display area splitting processing is started, the operation detection unit 112 determines whether or not a touch operation is received from a user (step S001). In a case where the touch operation is not received (No in step S001), the operation detection unit 112 repeatedly executes processing of step S001. On the other hand, in a case where it has received the operation on the touch panel 51 (Yes in step S001), the operation detection unit 112 shifts the processing to step S002.

Next, the operation detection unit 112 identifies the type of the touch operation (step S002). For example, when identifying a touch and drag operation on a pointer, the operation detection unit 112 detects a coordinate position of the pointer on the touch panel 51 and periodically (e.g. every 0.1 seconds) outputs a signal associated with the type of the touch operation (in this case, the touch and drag operation) to the display area setting unit 113. Further, when detecting that the touch is released, the operation detection unit 112 outputs a signal associated with the type of the touch operation (in this case, a touch release) and a coordinate position thereof to the display area setting unit 113.

Next, the display area setting unit 113 performs setting of the split areas or the full-screen area (step S003). For example when acquiring the signal indicating the coordinate position at which the touch has been released from the operation detection unit 112, the display area setting unit 113 identifies the touch release detection region (any one of O, P, Q, R, and E1 to E4) based on the coordinate position. For example, in a case where the coordinate position at which the touch has been released is any of the touch release detection regions O, P, Q, and R, the display area setting unit 113 determines the layout of the split areas and sets the split areas according to the layout.

Next, the display information generation unit 114 identifies the display information and the display form (step S004). For example, the display information generation unit 114 identifies the type of each of the split areas set by the display area setting unit 113. The display information generation unit 114 acquires predetermined information (not illustrated) including a correspondence relation between a position of each of the split areas and the display information type from the storage unit 102, and based on the type of the split areas and the display information type, it identifies the item of the display information and the display form to be displayed in each of the split areas from the display rule information.

Next, the display information generation unit 114 generates the display information in the display form that has been identified (step S005), and displays the information in each of the split areas (step S006). The display information generation unit 114 shifts the processing to step S001 and repeatedly executes the processing from steps S001 to S006.

Figure 10A:
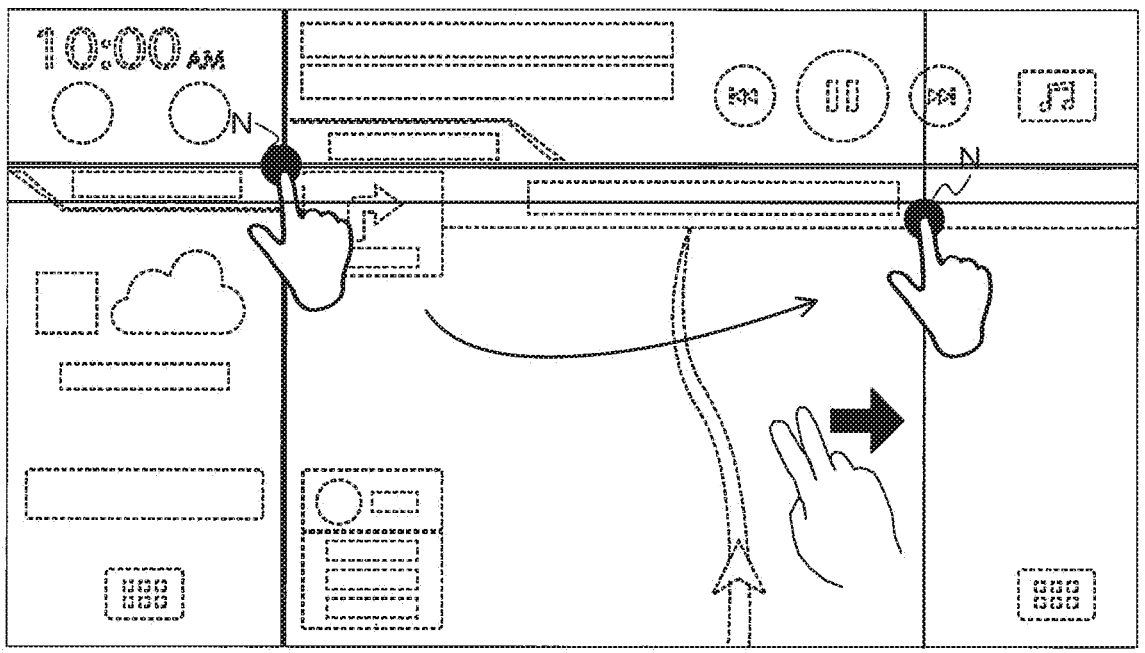
FIG. 10A is a view illustrating an example of the display information displayed in each of the split areas and a drag operation and a flick operation (or a swipe operation) of a pointer.
Figure 10B:
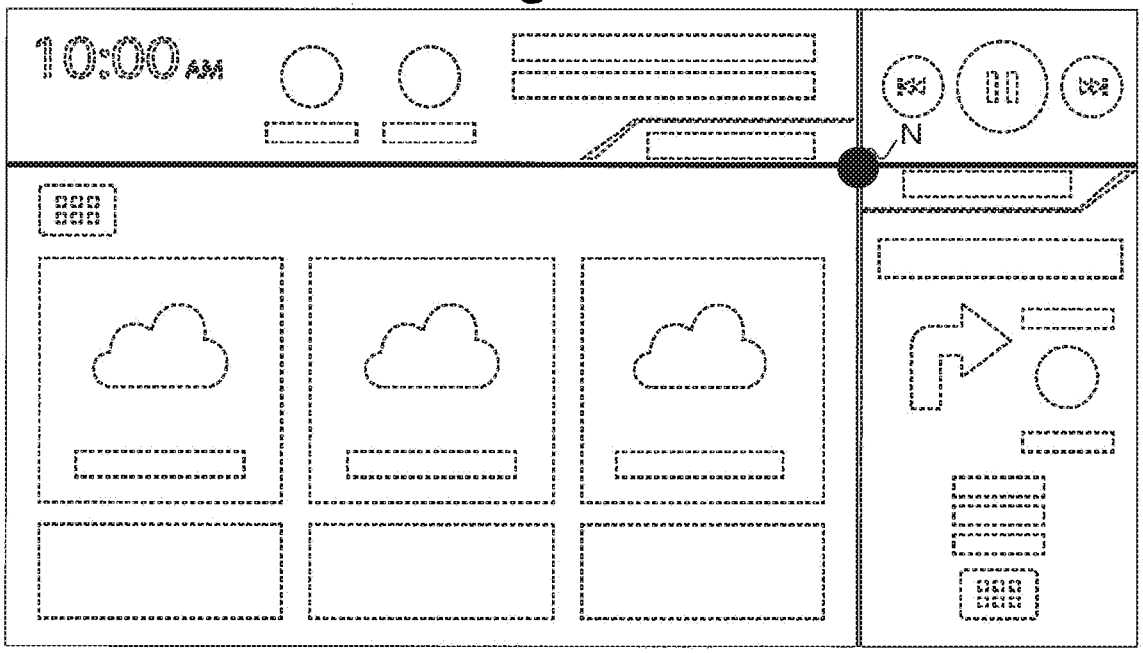
FIG. 10B is a view illustrating a layout of the split areas changed by the drag operation and the flick operation (or the swipe operation) and an example of the display information displayed in the split areas after a change.
Figure 11A:
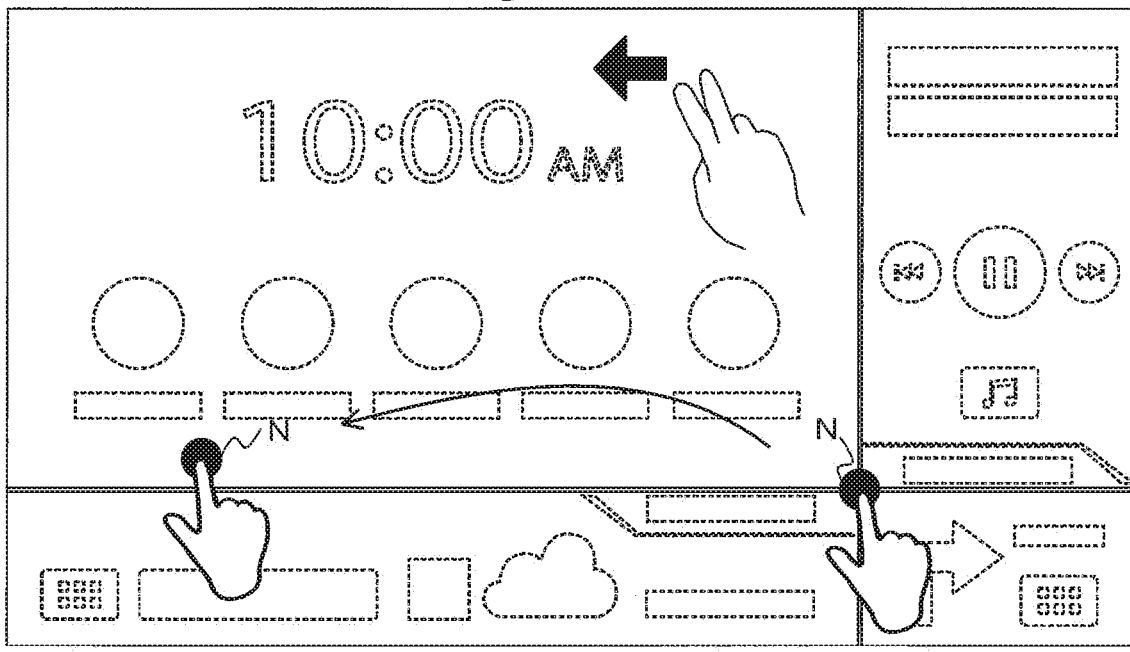
FIG. 11A is a view illustrating an example of the display information displayed in each of the split areas and the drag operation and the flick operation (or the swipe operation) of the pointer.
Figure 11B:
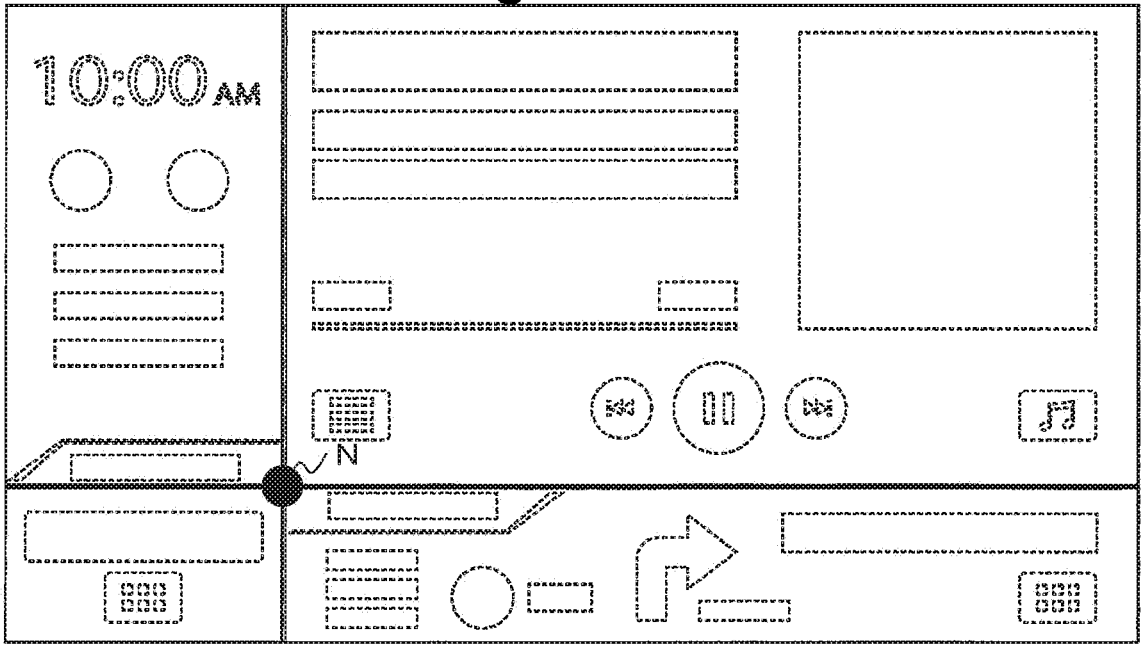
FIG. 11B is a view illustrating a layout of the split areas changed by the drag operation and the flick operation (or the swipe operation) and an example of the display information displayed in the split areas after a change.

FIGS. 10(a) and 11(a) are views illustrating an example of the display information displayed in each of the split areas and the drag operation and the flick operation (or the swipe operation) of the pointer. FIGS. 10(b) and 11(b) are views illustrating the layout of the split areas changed by the drag operation and the flick operation (or the swipe operation) and an example of the display information displayed in the split areas after a change.

As illustrated in FIGS. 10 and 11, with the in-vehicle device 100 according to this embodiment, it is possible to display the display information suitable for a size and a shape of each of the split areas in an easier-to-see display form in a case where the layout of the split areas is changed.

With the in-vehicle device 100 according to this embodiment, based on a position at which the touch on the pointer has been released and the direction of the flick operation, the split areas according to the one layout is applied among the layouts prepared in advance. Thus, it is not necessary to set the size and the shape of the split areas in detail. That is, an operation load on the user can be reduced compared to a case where the size and the shape of the split areas are freely variable by the user.

Further, with the in-vehicle device 100 according to this embodiment, the split areas are set according to the predetermined layouts. Accordingly, compared to the case where setting of the split areas is freely variable by the user, a processing load on the CPU 21 can be reduced.

Still further, with the in-vehicle device 100 according to this embodiment, it is possible to display by changing the number of and contents of items to be displayed for each of the display information types according to a change of the layout of the display area. Specifically, by identifying the item of the display information according to a shape type of the display area using the display rule information 122, the display information generation unit 114 identifies the number of and contents of the items to be displayed for each of the display information types.

FIG. 12 is a table illustrating an example of the display rule information 122. The display rule information 122 is information associating the display information type with the item thereof for each of the shape types of the display area. Specifically, for each shape type 123 of the display area, the display rule information 122 has a table associated with items related to the display information type such as navigation (NAVI) 124, audio (AUDIO) 125, application content (APP) 126, and a tool (TOOL) 127.

The shape type 123 of the display area is information indicating a layout type of the display area and includes the full screen, the three-fourth screen, the horizontal sub screen (horizontal band screen), the vertical sub screen (vertical band screen), and the small sub screen (small screen). The items 124 to 127 of each of the display information types are information indicating the items to be displayed in the display area (split area). For example, the item 124 of NAVI associated with the full screen and the three-fourth screen includes a map, a menu, a navigation setting, and the like. The item 124 of NAVI associated with the horizontal sub screen and the vertical sub screen includes left and right turn information, an intersection name, remaining distance, and the like as the guidance information. Further, the item 124 of NAVI associated with the small sub screen includes the left and right turn information, the remaining distance, and the like as the guidance information.

For example, the item 126 of APP associated with the full screen and the three-fourth screen includes a launcher, each of the applications, and the like. The item 126 of APP associated with the horizontal sub screen and the vertical sub screen includes a fixed application (specialized screen), a launcher call button, and the like.

In this way, in the display rule information 122, a larger number of items or the items requiring a relatively large display area (e.g. the map, the launcher, and the like) are associated with the large display area shape type (e.g. the full screen and the three-fourth screen) compared to with the small display area shape type (e.g. the horizontal sub screen and the like).

By using such display rule information 122, the display information generation unit 114 identifies the items to be displayed in the display area (each of the split areas).

Figure 13:
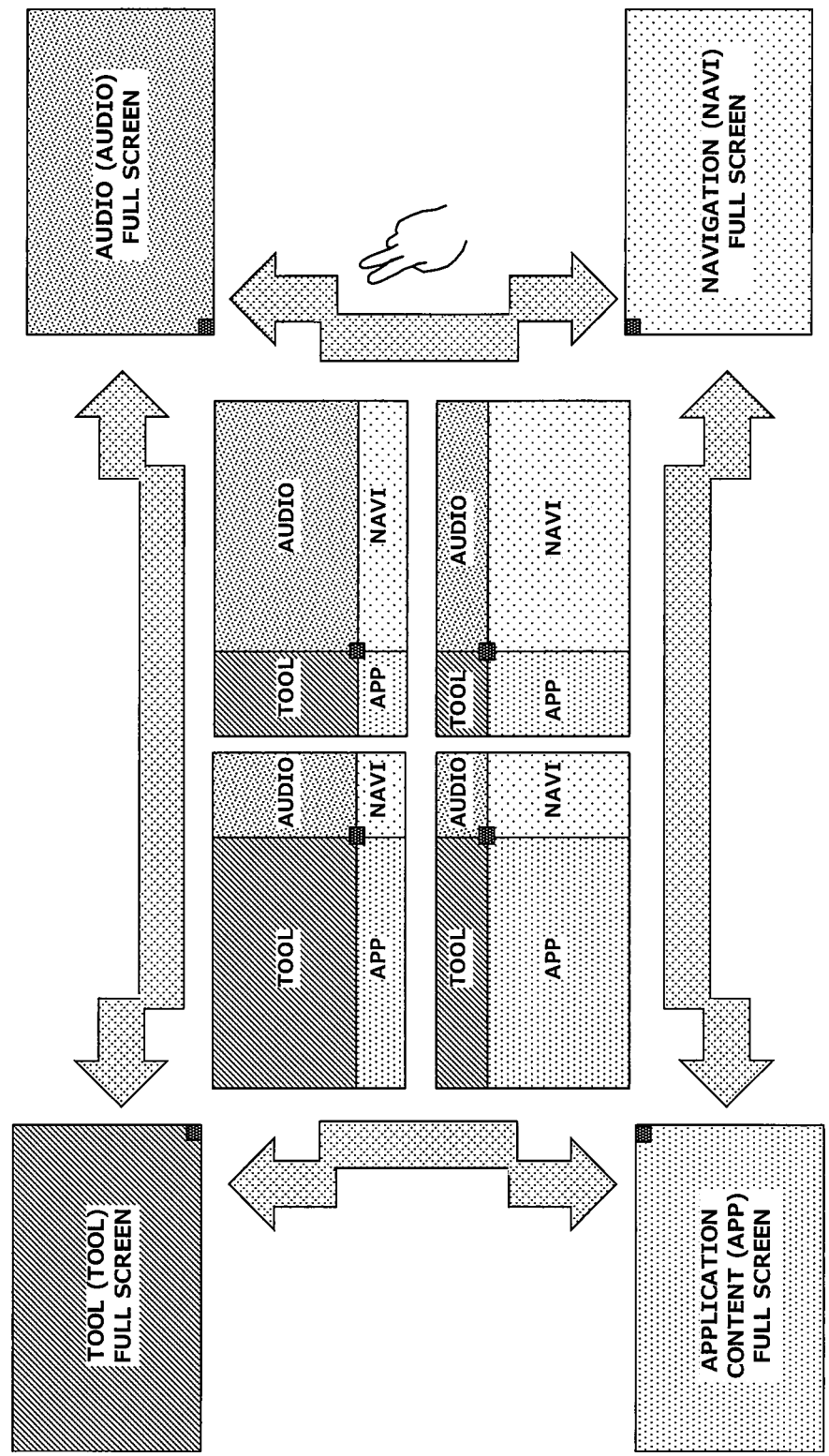
FIG. 13 is a view illustrating a layout change of the split display area in a case where a flick operation is performed on the display area with two fingers.

FIG. 13 is a view illustrating a layout change of the display area in a case where a flick operation is performed on the display area with two fingers.

Specifically, when detecting that a user has performed a flick operation at predetermined coordinates on the touch panel 51 displaying the map information with one finger, the operation detection unit 112 transmits a signal associating the coordinate position with a direction of the flick operation to the display information generation unit 114. When acquiring such signal, the display information generation unit 114 generates screen information in which the map information is scrolled in the direction of the flick operation and displays the information on the display 2.

On the other hand, when the operation detection unit 112 detects that the user has performed a flick operation with two fingers, the display information generation unit 114 changes the layout of the display area regardless of a position at which the fingers are released.

Accordingly, the in-vehicle device 100 is capable of distinguishing between scrolling of the map due to the flic flick operation with one finger and a layout change of the display area due to the flick operation with two fingers, whereby it is possible to improve user operability and convenience of the in-vehicle device 100.

Figure 14B:
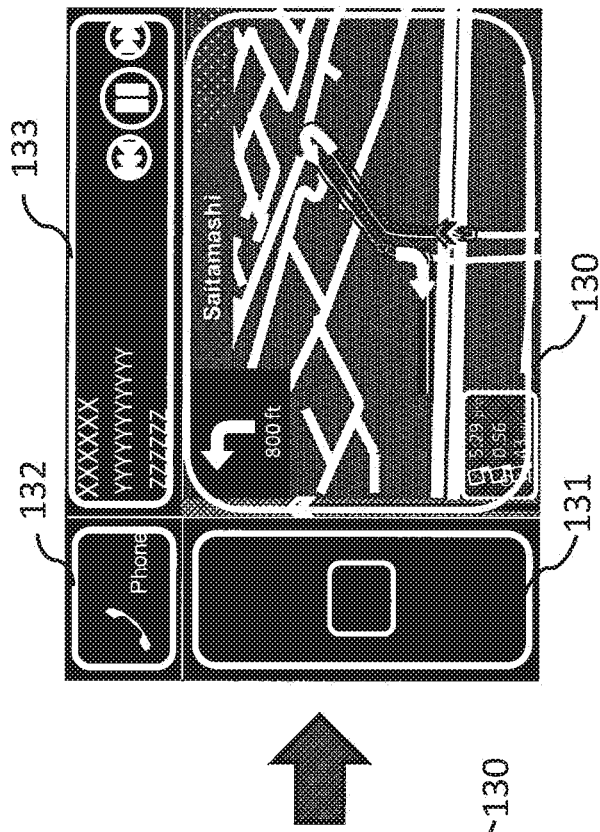
FIG. 14B is a view illustrating an example of display contents that change according to the layout.
Figure 14A:
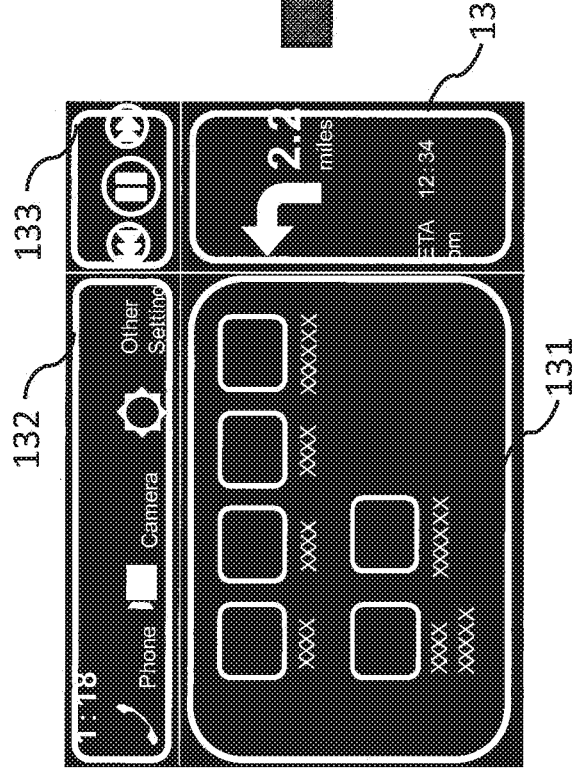
FIG. 14A is a view illustrating an example of display contents that change according to the layout.

FIG. 14 is a view illustrating an example of display contents that change according to a change from a layout of (a) to a layout of (b). As illustrated, the shape type of a display area 130 of NAVI in the layout of (a) before the change is the vertical sub screen. In this case, based on the display rule information 122, the display information generation unit 114 displays the left and right turn information and the remaining distance as the guidance information.

When the shape type of the display area 130 of NAVI becomes the three-fourth screen due to the change to the layout of (b), the display information generation unit 114 displays a map, which is displayable in the large display area, the menu, and the navigation setting based on the display rule information 122.

The shape type of a display area 131 of APP in the layout of (a) before the change is the three-fourth screen. In this case, based on the display rule information 122, the display information generation unit 114 displays the launcher, each of the applications, and the like. When the shape type of the display area 131 of APP becomes the vertical sub screen due to the change to the layout of (b), the display information generation unit 114 displays the launcher call button, which is easier to be seen by the user even in the small display area, based on the display rule information 122.

The shape type of a display area 132 of TOOL in the layout of (a) before the change is the horizontal sub screen. In this case, based on the display rule information 122, the display information generation unit 114 displays a clock, various indicators, and the like. When the shape type of the display area 132 of TOOL becomes the small sub screen due to the change to the layout of (b), the display information generation unit 114 displays the predetermined number of (one in this example) and a predetermined type of (telephone in this example) icons according to the small display area based on the display rule information 122.

The shape type of a display area 133 of AUDIO in the layout of (a) before the change is the small sub screen. In this case, based on the display rule information 122, the display information generation unit 114 displays the basic operation button. When the shape type of the display area 133 of AUDIO becomes the small sub screen due to the change to the layout of (b), the display information generation unit 114 displays each source play information, which can be displayed in the display area larger than the small sub screen, and the basic operation button based on the display rule information 122.

In this way, with the in-vehicle device 100 according to this embodiment, by using the display rule information 122, it is possible to display by changing the number of and contents of the items to be displayed for each of the display information types according to the change of the layout of the display area. For example, in a case where a large number of the items are displayed in the relatively small display area, it becomes difficult to be seen by the user. With the in-vehicle device 100 according to the present invention, such situation can be prevented by using the above-described display rule information 122.

With the in-vehicle device 100, by using the display rule information 122, it is also possible to control displaying and not displaying of the icons, which are touchable objects, according to the change of the layout of the display area. For example, in a case where a large number of the icons are displayed in the relatively small display area, the size thereof becomes small, and it becomes difficult to be touched by the user. In particular, since the user who is driving a vehicle has difficulties in visually recognizing the icons for a long time, the small-sized icons are more difficult to be touched. With the in-vehicle device 100 according to the present invention, such situation can be prevented by displaying the icons in the appropriate number and a form according to the display area by using the above-described display rule information 122.

When receiving a touch on the item or the icon displayed in the display area, the display information generation unit 114 changes the display information displayed in the display area to the predetermined display information identified according to the type of the item or the icon that has been touched. For example, in a case where an icon indicating that music or the like is being "played" is displayed in the display area related to the audio, when receiving a touch on such icon, the display information generation unit 114 changes the icon that has been touched to an icon indicating "stopped". For example, when receiving a touch on an icon indicating the predetermined application displayed in the display area related to APP, the display information generation unit 114 displays screen information according to the application of the icon that has been touched (e.g. when a telephone application is touched, an incoming and outgoing call history, a numerical key pad for inputting a telephone number, and the like).

The present invention is not limited to the above-described embodiments and may include various embodiments and modifications other than the above-described embodiments. For example, the above-described embodiments have been described in detail in order to describe the present invention in an easy-to-understand manner and are not necessarily limited to those including all of the configurations described. It is possible to replace part of a configuration of one embodiment with a configuration of another embodiment or modification as well as to add a configuration of the other embodiment to the configuration of one embodiment. Further, part of the configuration of each of the embodiments may be added with another configuration, deleted, or replaced therewith.

Part or all of the above-described configurations, functions, processing units, processing means, and the like may be achieved by a program that causes a processor to achieve each function. Information such as a program, a table, a file, and the like for achieving each of the functions may be placed in a storage device such as a memory, a hard disk, and a solid state drive (SSD) or a recording medium such as an IC card, a secure digital (SD) memory card, and a DVD. Note that a control line and an information line considered to be necessary for a description purpose have been illustrated, and not necessarily all of the control lines and the information lines within a product are illustrated.

REFERENCE SIGNS LIST

100 in-vehicle device
1 arithmetic processing device
2 display
3 storage device
4 audio input/output device
41 microphone
42 speaker
5 input device
51 touch panel
52 dial switch
6 ROM device
7 vehicle speed sensor
8 gyrosensor
9 GPS receiving device
10 FM multiplex broadcasting receiving device
11 beacon receiving device
101 arithmetic unit
102 storage unit
111 input receiving unit
112 operation detection unit
113 display area setting unit 114 display information generation unit
121 map information
122 display rule information

The invention claimed is:

1. An in-vehicle device comprising:
a display, having a display area split into a plurality of split areas, capable of displaying a plurality of predetermined layouts with a position of a side of each of the plurality of split areas partitioning the plurality of split areas being different from each other; and
a central processing unit configured to:
  detect an operation on a touch panel;
  select one layout, from the plurality of predetermined layouts, to be displayed in the display based on the operation on the touch panel having been detected, the one layout being selected based on an operation to specify a single point on a side partitioning the split areas displayed in the display and to move the single point on a screen of the display to a position corresponding to the selected one layout;
  identify an item and an arrangement of a display information based on a display information type associated with a release position of the operation or a touch position and a shape type of the display area; and
  display the display information in the display form having been identified;
  wherein a first item of the display information is displayed in a first arrangement when the display area is a first shape type, and a second item of the display information that is different from the first item is displayed in a second arrangement that is different from the first arrangement when the display area is a second shape type that is different from the first shape type, wherein the first and second shape types are selected from a plurality of shape types including a full screen, a three-fourths screen, a horizontal band screen, a vertical band screen and a small screen.

2. The in-vehicle device according to claim 1, wherein the central processing unit is configured to select the layout of the split areas based on the release position of the operation detected by the central processing unit.

3. The in-vehicle device according to claim 1, wherein the central processing unit is configured to select the layout of the split areas based on an operation direction on the touch panel detected by the central processing unit.

4. The in-vehicle device according to claim 1, wherein the central processing unit is further configured to:
set a full-screen area in which an entire screen is one display area based on the release position of the operation or the touch position and a number of touches detected by the central processing unit.

5. The in-vehicle device according to claim 1, wherein the layout of the split areas is constituted of
a split area being a similar figure of an entire display area and occupying substantially three-fourth of the entire display area, and
a plurality of split areas formed by extending a long side and a short side partitioning the split area being the similar figure.

6. The in-vehicle device according to claim 1, wherein the plurality of split areas is constituted of four split areas partitioned by a horizontal side and a vertical side, and the single point is an intersection point of the horizontal side and the vertical side.

7. The in-vehicle device according to claim 1, wherein
when the shape type of the display area is wider compared to a shape type of other display areas displayed at the same time, a launcher icon for each of a plurality of application contents is displayed; and
when the shape type of the display area is narrower compared to a shape type of other display areas displayed at the same time, a launcher call button that provides access to the launcher icon for each of the plurality of application contents is displayed.

8. An information control device comprising:
a memory configured to store multiple types of layouts of a display area including a first display area displaying first information and a second display area displaying second information; and
a central processing unit configured to determine the first information displayed in the first display area and the second information displayed in the second display area, wherein
the central processing unit selects any of the multiple types of layouts based on a release position at which contact on a touch panel is released, and
when the contact on the touch panel is released, the central processing unit moves a partition line partitioning one display area from another display area and an intersection point of the partition line and another partition line according to the release position to a predetermined position corresponding to the selected layout,
wherein the central processing unit
  identifies an item and an arrangement of a display information based on a display information type associated with a release position of the operation or a touch position and a shape type of the display area, and
  displays the display information in the display form having been identified;
  wherein a first item of the display information is displayed in a first arrangement when the display area is a first shape type, and a second item of the display information that is different from the first item is displayed in a second arrangement that is different from the first arrangement when the display area is a second shape type that is different from the first shape type, wherein the first and second shape types are selected from a plurality of shape types including a full screen, a three-fourths screen, a horizontal band screen, a vertical band screen and a small screen.

9. The information control device according to claim 8, wherein
the central processing unit
  selects a first layout when the position at which the contact on the touch panel is released is within the first display area, and
  selects a second layout when the position at which the contact on the touch panel is released is within the second display area.

10. The information control device according to 8, wherein
when contact on a touch panel is performed in a first aspect, the central processing unit selects any of the multiple types of the layouts based on a position at which the contact on the touch panel is released, and
when the contact on the touch panel is performed in a second aspect, the central processing unit selects any of the multiple types of the layouts based on a direction identified by a position at which the contact on the touch panel is performed and the position at which the contact on the touch panel is released.

11. The information control device according to claim 8, wherein
the central processing unit displays a display item included in the first information displayed in the first display area when the first layout is selected differently from a display item included in the first information displayed in the first display area when the second layout is selected.

12. The information control device according to claim 11, wherein
when contact is performed on the display item, the central processing unit changes display of the first information displayed in the first display area.

13. The information control device according to claim 8, wherein the central processing unit
displays the split areas that change shapes thereof according to a pointer position while detecting touch operation on a pointer, and
selects the layout according to the release position of the touch operation and moves the intersection point to a position corresponding to the selected layout when the touch operation on the pointer is released.

14. A display area splitting method executed by an in-vehicle device including a display, the method comprising:
splitting a display area of the display split into a plurality of split areas, the display being capable of displaying a plurality of predetermined layouts with a position of a side of each of the plurality of split areas partitioning the plurality of split areas being different from each other;
detecting operation on the touch panel;
selecting one layout, from the plurality of predetermined layouts, to be displayed in the display based on the operation on the touch panel having been detected by the detecting step, the one layout being selected based on an operation to specify a single point on the side partitioning the split areas displayed by the display step and to move the single point on a screen of the display to a position corresponding to the selected one layout;
identifying an item and an arrangement of a display information based on a display information type associated with a release position of the operation or a touch position and a shape type of the display area; and
displaying the display information in the display form having been identified;
wherein a first item of the display information is displayed in a first arrangement when the display area is a first shape type, and a second item of the display information that is different from the first item is displayed in a second arrangement that is different from the first arrangement when the display area is a second shape type that is different from the first shape type, wherein the first and second shape types are selected from a plurality of shape types including a full screen, a three-fourths screen, a horizontal band screen, a vertical band screen and a small screen.

15. A non-transitory computer-readable medium storing a program causing a computer to function as an in-vehicle device having a display, wherein the program causes the computer to:
split a display area of the display into a plurality of split areas, the display being capable of displaying a plurality of layouts with a position of a side of each of the plurality of split areas partitioning the plurality of split areas being different from each other;
detect an operation on the touch panel;
select one layout, from the plurality of predetermined layouts, to be displayed in the display based on the operation on the touch panel having been detected, the one layout being selected based on an operation to specify a single point on the side partitioning the split areas displayed in the display and to move the single point on a screen of the display to a position corresponding to the selected one layout;
identify an item and an arrangement of a display information based on a display information type associated with a release position of the operation or a touch position and a shape type of the display area; and
display the display information in the display form having been identified;
wherein a first item of the display information is displayed in a first arrangement when the display area is a first shape type, and a second item of the display information that is different from the first item is displayed in a second arrangement that is different from the first arrangement when the display area is a second shape type that is different from the first shape type, wherein the first and second shape types are selected from a plurality of shape types including a full screen, a three-fourths screen, a horizontal band screen, a vertical band screen and a small screen.

* * * * *